June 29, 1971 K. S. TARNEJA ET AL 3,589,946

SOLAR CELL WITH ELECTRICAL CONTACT GRID ARRANGEMENT

Filed Sept. 6, 1968 2 Sheets-Sheet 1

WITNESSES:
Bernard R. Giegucz
Donald M. Winegar

INVENTORS
Krishan S. Tarneja &
Vito A. Rossi.
BY
C. L. Menzemer
ATTORNEY 3,589,946

SOLAR CELL WITH ELECTRICAL CONTACT GRID ARRANGEMENT

Krishan S. Tarneja, Pittsburgh, Pa., and Vito A. Rossi, Hawthorne, Calif., assignors to Westinghouse Electric Corporation, Pittsburgh, Pa.

Filed Sept. 6, 1968, Ser. No. 758,075
Int. Cl. H01l 5/02
U.S. Cl. 136—89 10 Claims

ABSTRACT OF THE DISCLOSURE

This disclosure relates to a solar cell with an electrical grid structure which when affixed to a surface of the solar cell leaves exposed at least 95% of the surface for exposure to a radiant energy source.

This invention relates to a novel arrangement for an electrical contact grid for solar cells.

One of the most important parameters that limit the efficiency of the solar cell is its series resistance. Various methods have been devised to reduce the series resistance among which the use of electrical grid contacts on the diffused surface gave most satisfactory results. One of the serious disadvantages of electrical grid structures on solar cells is that part of the active area of the cell is lost.

Various electrical grid structure patterns are now being used in which the entire electrical grid structure is located on the upper surface of the solar cell exposed to a light source. The electrical grid structure consists of a number of metallic strips joined by a common collector strip. In the conventional design of the solar cells, the collector strip also is located on the active surface of the solar cell. Since the collector strip has to be wide enough to carry the current density, a further appreciable loss in active area results because of the location of the collector strip on the active surface. Consequently, from 10 percent to 12 percent of the active area of a cell is lost because the active area is covered by the electrical grid structure.

Additionally, the present electrical grid structure patterns are not capable of efficiently collecting the carriers released in solar cells having a graded, or drift field, region of semiconductivity and a shallow p-n junction. Solar cells embodying a drift field region of semiconductivity and a shallow p-n junction are desirable for space applications where the solar cells are subject to the effects of radiation. The present electrical grid structure patterns do not enable one to achieve the high efficiencies expected from solar cells having a shallow semiconductivity transition region.

One attributed reason for failure to obtain these expected high efficiencies is that the present electrical grid structures do not provide an efficient means for collecting the carriers present in the region of semiconductivity to which the grid is affixed. Consequently, the radiation experienced by the solar cell extinguishes the activity of a greater number of carriers than anticipated with the resultant decrease in the expected power output for the solar cell.

An object of the present invention is to provide a new electrical grid structure arrangement on a solar cell whereby a larger area of active surface of the solar cell is available than has heretofore been possible.

Another object of the present invention is to provide a new electrical grid structure arrangement on a solar cell which leaves at least 95 percent of the active surface area free to light exposure.

Other objects will be apparent from time to time in the following detailed discussion and description.

The invention will be most readily understood upon considering its description in conjunction with the attached drawings, in which.

In accordance with the teachings of this invention and in attainment of the foregoing objects, there is provided a solar cell comprising a body of semiconductor material having at least one major surface, and an electrical grid structure approximately centered on the major surface of, and in electrical contact with, the body, the electrical grid structure comprising an electrically conductive strip disposed longitudinally on the major surface of the body and at least one electrically conductive collector strip disposed transverse to, and electrically connected to the longitudinally disposed strip, the cross-sectional area of the collector strip being at least twice the cross-sectional area of the longitudinal strip, the width of the collector strip being approximately $\frac{1}{120}$ the length of the major surface, the major surface of the body having a length to width ratio of approximately 9 to 1 and the active area of the major surface of the body is at least 95 percent with the electrical grid disposed thereon.

Figure 1:
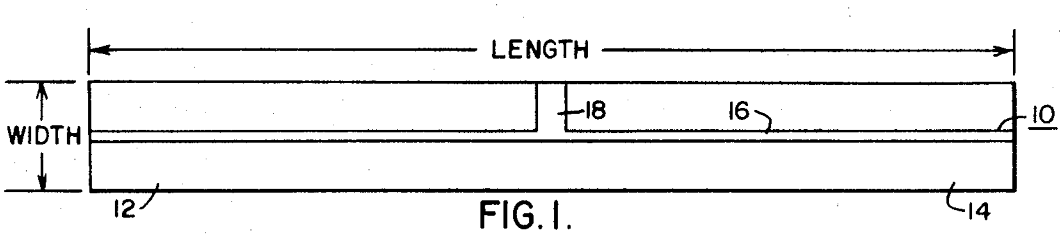
FIG. 1 is a top view of a basic electrical grid structure embodying the teachings of the invention.

With reference to FIG. 1, there is shown a basic electrical grid structure 10 approximately centrally disposed on a basic area unit of a major surface 12 and in electrical contact with a body 14 of semiconductor material. The major surface 12 is the active area of the body 14 of semiconductor material, which when suitably processed will react to a light source releasing carriers to be collected by the electrical grid structure 10.

The electrical grid structure 10 is designed to allow at least 95 percent of the active area of the basic unit of the body 14 of semiconductor material to be exposed to a light source.

The electrical grid structure 10 consists of an electrically conductive strip 16 disposed longitudinally on the major surface 12 of the basic area unit and an electrically conductive collector strip 18 disposed on the major surface 12, transverse to, and electrically connected to the longitudinal strip 18. Preferably, each of the strips 16 and 18 are approximately centered on the major surface 12 of the body 14.

The electrical grid structure 10 has been formed to be an efficient collector of carriers released in the active area of the major surface 12 whose basic area unit has a measurement of length approximately nine times greater than the width of the basic area unit.

To permit at least 95 percent of the major surface 12 to be an active area exposed to a light source and still be able to collect the carriers released within the active area, ratios for determining the dimensions of the electrical grid structure 10 have been established.

It has been found that the collector strip 18 should have a cross-sectional area approximately twice the cross-sectional area of the longitudinal strip 16. The width of the collector strip 18 should also be approximately $\frac{1}{120}$ of the length of the basic unit area. The collector strip 18 does not have to extend across the entire width of the basic unit area in order to achieve an acceptable working efficiency level for the electrical grid structure 10.

Figure 2:
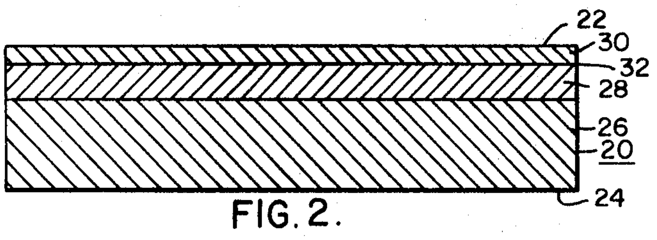
FIG. 2 is a cross-sectional view of a body of semiconductor material.

With reference to FIG. 2, there is shown a body 20 of semiconductor material suitable for use in making a solar cell and employing an electrical grid structure made in accordance with the teachings of this invention.

The body 20 has a major top surface 22 which is substantially parallel to a major bottom surface 24, a first region 26 of first type semiconductivity having a drift field region 28 comprising a portion of the region 26, a second region 30 of second type semiconductivity and a p-n junction 32 formed at the interface between the region 30 and the region 28 of the region 26.

The material comprising the body 20 is one selected from the group of semiconductor materials consisting of silicon, silicon carbide, germanium, compounds of Group III and Group V elements and compounds of Group II and Group VI elements.

A piece of semiconductor material in the form of a web dendrite is particularly suitable for comprising the body 20 utilizing the electrical grid structure 10.

More particularly, the body 20 of semiconductor material preferably is at least 1 centimeter in width and 3 centimeters in length or multiples of length thereof.

For purposes of illustration only, and for no other reasons, the body 20 will be described as a portion of silicon web dendritic material 1 centimeter in width and 30 centimeters in length. The region 26 is of p-type semiconductivity having a preferred resistivity of 0.01 ohm-centimeter. The drift field region 28 is graded from a resistivity of 0.01 ohm-centimeter to a resistivity of 10 ohm-centimeter at the p-n junction 32. The region 30 is of n-type semiconductivity having a preferred resistivity of $2\times10^{-3}$ ohm-centimeter.

Figure 3:
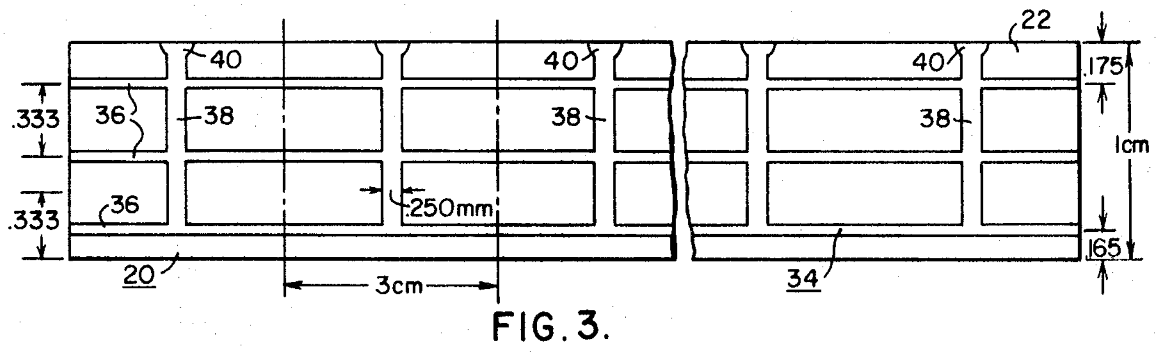
FIG. 3 is a top view of an electrical grid structure embodying the teachings of this invention disposed on a surface of the body shown in FIG. 2.

With reference to FIG. 3 an electrical grid structure 34 is shown approximately centrally disposed on the major surface 22 of, and in electrical contact with, the body 20. The grid structure 34 consists of a plurality of equally spaced electrically conductive metal strips 36 disposed longitudinally on the major surface 22 and a plurality of equally spaced electrically conductive collector strips 38 disposed transverse to, and electrically connected to, each longitudinal strip 36.

As a means of convenience, the major surface 22 of the body 20 is divided into unit areas measuring approximately 3 centimeters in length and one-third centimeter in width. This is in keeping with the ratios established in the basic electrical grid structure design 10 shown in FIG. 1. Since the body 20 is 1 centimeter in width, three (3) longitudinal strips 36 are required. The body 10 being 30 centimeters long therefore establishes the need of ten (10) collector strips 38.

Employing the ratios established for the basic electrical grid structure 10 design (FIG. 1), the width of each collector strip 38 is $\frac{1}{120}$ the unit area length of 3 centimeters or 0.250 millimeter. The collector strips 38 and the longitudinal strips 36 are preferably disposed on the surface 22 simultaneously and each has the same thickness. Therefore, the width of the longitudinal strips 36 are one-half the width of the collector strips 38 or 0.125 millimeter.

Each end 40 of the collector strips 38 is enlarged to establish a greater joining area for electrically connecting the electrical grid structure 34 into an electrical circuit of similar electrical grid structures in either a series electrical or a parallel electrical circuit. The dimension of the end 40 is preferably a diameter length equal to twice the width of the collector strip 38 or 0.500 millimeter.

The electrical grid structure 34 is disposed on the surface 22 by suitable means known to those skilled in the art. Such suitable means include evaporating one or more metals, such for example, as titanium and silver onto the surface 22 in a vacuum evaporation chamber. Subsequently, a sintering operation forms both a physical bond, as well as an ohmic contact, with the metal and the region 30.

Figure 4:
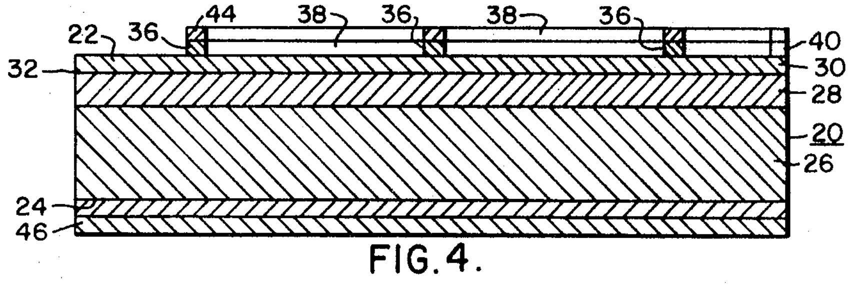
FIG. 4 is a view, partly in cross-section, of the structure shown in FIG. 3.

Referring to FIG. 4 a layer 42 of electrical contact metal is shown disposed on substantially all of the bottom surface 24 of the body 20. Deposition of the layer 42 is accomplished in the same manner as the deposition of the electrical grid structure 34 on the surface 22. Therefore, the layer 42 is physically bonded to the region 26 of the body 20 as well as being in an ohmic electrical contact with the region 26.

Although not required, layers 44 and 46 of electrically conductive solder metal may be disposed on the electrical grid structure 34 and the electrical contact layer 42 respectively. The solder layers 44 and 46 may be formed by any suitable process means known to those skilled in the art, such for example, as the dip solder method and the flow solder process. The solder layers 44 and 46 enable the grid structure 34 to more easily conduct the electrical energy generated within the exposed active areas of the surface 22.

Figure 5:
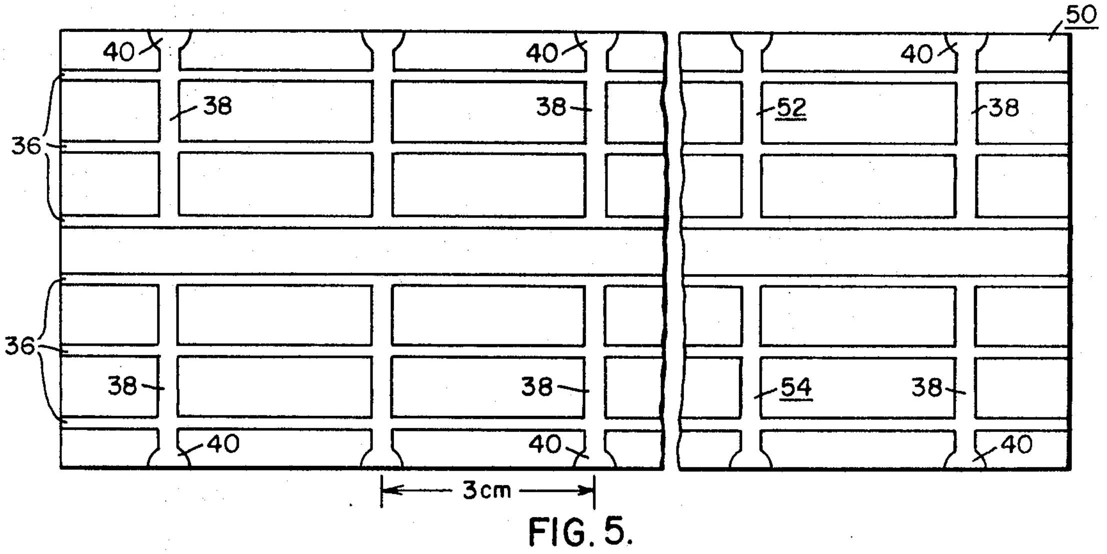
FIG. 5 is a top view of a body of semiconductor material utilizing an electrical contact grid structure embodying the teachings of this invention.

With reference to FIG. 5, there is shown the incorporation of the basic electrical grid structure 10 (FIG. 1) in a preferable grid structure arrangement for a body 50 of semiconductor material having a preferred length of 30 centimeters and a preferred width of 2 centimeters.

A first electrical grid structure 52, the same as the electrical grid structure 34 of FIG. 3, is disposed on one-half the width, or 1 centimeter of the body 50. A second electrical grid structure 54, a mirror image of the structure 52, is disposed on the second half of the body 50 width.

The electrical grid structure 52 is a preferred embodiment of this invention when the width of a body of semiconductor material is great enough that the width of the collector strips 38 must be increased to efficiently transport the carriers collected. However, if the strips 38 become too wide then the active area of the body 50 may become less than 95 percent.

The following example is illustrative of the teachings of this invention:

A first solar cell was fabricated embodying the electrical grid structure made in accordance with the teachings of this invention.

A web portion of webbed silicon dendritic semiconductor material measuring 30 centimeters in length, 1 centimeter in width and 0.05 centimeter in thickness was prepared by suitable means known to those skilled in the art for the growth of epitaxial silicon on one surface. The web portion had a resistivity of 0.01 ohm-centimeter.

An epitaxial layer of silicon was deposited by vapor deposition on one surface of the web portion. The epitaxial layer of silicon was deposited from the pyrolytic decomposition of a gaseous mixture of silane and hydrogen. During the epitaxial growth process, boron hydride was introduced into the gaseous mixture in a decreasing flow concentration. The resulting epitaxial layer was 40 microns in thickness and had a region of semiconductivity graded from $10^{19}$ atoms of boron per centimeter to a final surface concentration of approximately $10^{15}$ atoms of boron per cubic centimeter.

Employing a $P_2O_5$ diffusion source and a diffusion time of 15 minutes at a temperature of $850°+5°$ C., an n-type region of semiconductivity, 0.3 micron in thickness and having a surface resistivity of 0.02 ohm-centimeter was formed in the upper region of the graded epitaxial layer.

Utilizing the photoresist technique, an electrical grid structure, the same as shown in FIG. 3 was vapor deposited on the surface of the n-type region of the web portion in a vacuum evaporation chamber. The electrically conductive strips consisted of a first layer of titanium 1,000 A. units in thickness, upon which was deposited a layer of silver 5,000 A. units in thickness.

The web portion then had the same metals of the same thicknesses deposited on the bottom surface of the web portion to form an electrical contact on the bottom surface.

The web portion was removed from the vacuum evaporation chamber and the photoresist masking material was removed from the surface having the grid structure deposited thereon.

The web portion was then heated to 400° C.±50° C. for 15 minutes in a furnace having a dry hydrogen atmosphere. This process physically bonded the electrical grid structure to the n-type region of semiconductivity and provided an ohmic electrical contact to the region. Simultaneously the electrical contact on the bottom surface was physically bonded to the web portion and an ohmic electrical contact resulted between the electrical contact and the original web portion.

No electrical solder was disposed on either the electrical contact or the electrical grid structure.

The active area of the solar cell was calculated to be at least 95 percent.

In the same manner, a second solar cell was fabricated from a web portion of silicon web dendritic material. The second solar cell was exactly the same as the first solar cell, except for the electrical grid structure design only.

Figure 6:
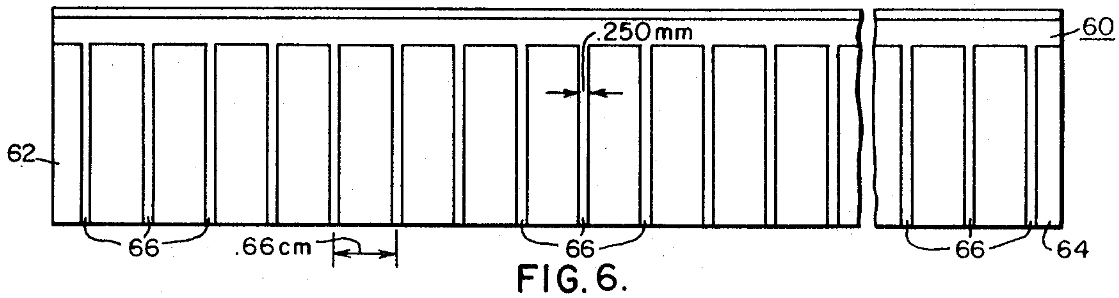
FIG. 6 is a plan view of an electrical grid structure made in accordance with prior art teachings.

The electrical grid structure disposed on the surface of the n-type region of semiconductivity was of a prior art design. FIG. 6 illustrates the design of the electrical grid structure 60 employed.

The electrical grid structure 60 of the prior art design was disposed on, and in electrical contact with, a major surface 62 of a web portion 64 of web dendritic material 1 centimeter in width and 30 centimeters in length.

The structure 60 consisted of 45 electrically conductive strips 66 disposed transverse on the surface 62 of the web portion 64. The strips 66 were spaced 0.66 centimeter paart centerline to centerline. Each end strip 66 was spaced approximately 0.33 centimeter from the end of the web portion 64 to the centerline of the strip 66. Each of the strips 66 measured 0.250 millimeter in width.

A bus bar, or collector strip 68, 1 millimeter in width, was disposed longitudinally on the surface 62, along the entire length of one side of the top surface 62 of the web portion 64. The collector strip 68 was electrically connected to each of the strips 66.

The structure 60 and the electrical contact on the bottom of the web portion 64 was fabricated of the same materials having the thicknesses and employing the same fabrication technique.

Calculations showed that more than 10 percent of the surface 62 was covered by the grid structure 60.

Both solar cells were exposed to the same light source simultaneously. Results showed that the electrical energy generated in the first solar cell employing the new grid structure embodying the teachings of this invention indicated an efficiency of 11 percent for this solar cell. The electrical energy generated in the second solar cell employing the prior art grid structure indicated that the second solar cell was only 9 percent efficient.

In comparing the efficiencies of solar cells which comprise the same materials and are fabricated in the exact same manner as each other except for the electrical grid structure employed, the increased efficiency of the solar cell employing the new electrical grid structure made in accordance with the teachings of this invention is greater than that expected by increasing the exposed active surface by 5 percent. The added increase in efficiency is obtained from a more efficient manner of collecting the carriers present in drift field solar cells which have a shallow semiconductor transition region when exposed to a light source.

Figure 7:
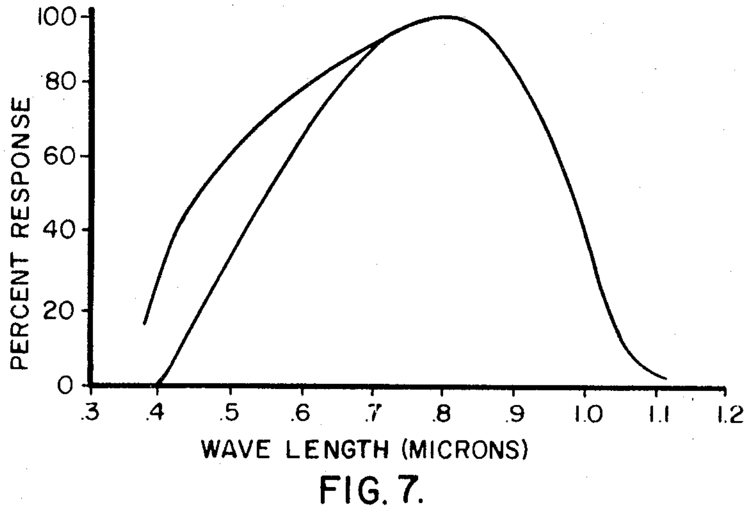
FIG. 7 is a graphical comparison of the spectral response obtained by a solar cell embodying an electrical grid structure embodying the teachings of this invention compared to a similar solar cell embodying an electrical grid structure embodying prior art teaching.

FIG. 7 is a graphic illustration of the spectral response achieved by the solar cell employing the new electrical grid structure when compared to the prior art electrical grid structure used in fabricating the other solar cell. It is to be noted that the new electrical grid structure enables a solar cell upon which it is disposed to achieve a greater spectral response than does the prior art electrical grid structure.

The improvement in the spectral response resulting from the employment of the new electrical grid system disposed on a shallow semiconductor transition region also increases the resistance of the solar cell to radiation damage. This is emphasized by the fact that the new electrical grid structure collected a greater amount of carriers during use than anticipated.

The new electrical grid structure embodying the teachings of this invention is also suitable for other solar cell structures. The new electrical grid structure will increase the active surface area of a solar cell to at least 95 percent. These solar cells need not incorporate a graded region of semiconductivity, nor do these solar cells require a shallow semiconductor transition region in order to achieve an increase in the unit power output and therefore increasing the efficiency of the solar cell embodying this new electrical grid structure.

While the invention has been described with reference to particular embodiments and example, it will be understood, of course, that modifications, substitutions and the like may be made therein without departing from its scope.

What is claimed is:

1. A solar cell comprising a body of semiconductor material having at least one major surface, an electrical grid structure approximately centered on the major surface, and in electrical contact with the body, the electrical grid structure comprising an electrically conductive strip disposed longitudinally on the major surface of the body and at least one electrically conductive collector strip disposed transverse to, and electrically connected to the longitudinally disposed strip, the cross-sectional area of the collector strip being approximately twice the cross-sectional area of the longitudinal strip, the width of the collector strip being approximately $\frac{1}{120}$ the length of the major surface, the major surface of the body on which the grid is disposed having a length to width ratio of approximately 9 to 1 and the active area of the major surface of the body is at least 95 percent with the electrical grid disposed thereon.

2. The solar cell of claim 1 in which the body of semiconductor material measures 1 centimeter in width and 3 centimeters in length and multiples of the aforesaid length.

3. The solar cell of claim 1 in which the electrical grid structure consists of at least three equally spaced longitudinal strips and at least one collector strip for each 3 centimeters of length of the body.

4. The solar cell of claim 1 in which the body is of silicon.

5. The solar cell of claim 1 in which the body is of silicon 1 centimeter in width and 3 centimeters in length and multiples of the aforesaid length, and the electrical grid structure consists of three equally spaced longitudinal strips, each strip measuring 0.125 millimeter in width and one collector strip for each 3 centimeters of length of the body, the collector strip measuring 0.250 millimeter in width.

6. The solar cell of claim 1 in which the original electrical grid structure is disposed on one half of the width of the body and a second electrical grid structure, a mirror image of the original electrical grid structure is disposed on a second half of the width of the body.

7. A solar cell comprising a body of silicon, said body having a top surface and a bottom surface, said body comprising a first region of first type semiconductivity, a second region of second type conductivity and a p-n junction disposed between the two regions, the first region extending from the p-n junction to the top surface of the body, the second region extending from the p-n junction to the bottom surface, the resistivity of said second region being at a maximum at the p-n junction and decreasing as it approaches the bottom surface, and an electrical grid structure approximately centered on the top surface of, and in electrical contact with, the body, the electrical grid structure comprising an electrically conductive collector strip disposed transverse to, and electrically connected to the longitudinally disposed strip, the cross-sectional area of the collector strip being approximately twice the cross-sectional area of the longitudinal strip, the width of the collector strip being approximately 1/120 the length of the top surface, the top surface of the body having a length to width ratio of approximately 9 to 1 and the active area of the top surface of the body is at least 95 percent with the electrical grid disposed thereon.

8. The solar cell of claim 7 in which the first region of semiconductivity is no greater than 0.5 micron in thickness.

9. The solar cell of claim 7 in which the top surface of the body measures 1 centimeter in width and 3 centimeters in length and multiples of the aforesaid length.

10. The solar cell of claim 7 in which the top surface of the body measures 1 centimeter in width and 3 centimeters in length and multiples of the aforesaid length, and the electrical grid structure consists of three equally spaced longitudinal strips, each strip measuring 0.125 millimeter in width and one collector strip for 3 centimeters of length of the body, the collector strip measuring 0.250 millimeter in width.

References Cited

UNITED STATES PATENTS

| | | | |
|---|---|---|---|
| 3,094,439 | 6/1963 | Mann et al. | 136—89 |
| 3,324,299 | 6/1967 | Schuil | 136—89UX |
| 3,483,039 | 12/1969 | Gault | 136—89 |

ALLEN B. CURTIS, Primary Examiner